MULTIPLEX SYSTEM

Filed June 22, 1950 2 Sheets-Sheet 1

INVENTOR
George C. Sziklai
BY [signature]
ATTORNEY

Jan. 28, 1964 G. C. SZIKLAI 3,119,899

MULTIPLEX SYSTEM

Filed June 22, 1950 2 Sheets-Sheet 2

INVENTOR
George C. Sziklai
BY [signature]
ATTORNEY 3,119,899
Patented Jan. 28, 1964

3,119,899

MULTIPLEX SYSTEMS

George C. Sziklai, Princeton, N.J., assignor to Radio Corporation of America, a corporation of Delaware Filed June 22, 1950, Ser. No. 169,594
17 Claims. (Cl. 178—5.4)

The present invention relates to electrical signal multiplexing in signal communication systems and more particularly although not necessarily exclusively, to time division multiplexing arrangements and methods for use in transmitting time division multiplex color television signals.

More directly, the present invention relates to an improved method and apparatus for executing the required signal sampling and signal distribution in dot multiplex type color television systems.

Some of the more promising present day systems of color television transmission are based on what is commonly known as a time division signal multiplexing. That is to say, the transmitted color television signal represents successive sampling intervals during which intervals the television transmitter samples the output of one of two or more color television cameras. Each color camera develops at its output a signal representing the particular color version of the scene being transmitted to which it is responsive.

Broadly speaking, the time division multiplexing process in some form is carried out in all color television systems of the field sequential, line sequential and dot multiplex varieties.

In the dot multiplex color transmission system, with which the present invention is most directly but not necessarily exclusively concerned, the transmitted signal comprises a synchronzing component and a color information component. Due to frequency band width limitations of available radio communication channels the individual sampling periods of the dot multiplex signal, do not remain well refined but merge into a substantial sinusoidal wave. This sine wave is, of course, of the multiplex sampling frequency and by changing its phase relative to given datum it is definitive of the various colors to be reproduced at the receiver. The datum with respect to which the phase of the transmitted sine wave varies, may be communicated to the receiver in a variety of forms. One present-day system, which is quite satisfactory, transmits bursts of the sampling frequency during the back porch of the standard television horizontal synchronizing pedestal.

As is well known by those familiar with the dot multiplex color television art, the brightness of a particular color is defined by the amplitude of the transmitted sine wave. Naturally, throughout a given transmission in which both brightness and color changes are rapidly occurring, the transmitted signal will not actually resemble a sine wave since its amplitude and phase are being continuously altered in accordance with the color picture detail.

Many arrangements have been suggested for processing and reproducing the color television receiver at the receiving end. Most all of such systems have incorporated the prior art technique of resampling or time-distributing the received color signal to a number of color channels corresponding in number and type to those employed at the transmitter. Resampled or distributed signal information in the receiver is then caused to produce representative color images which are by some means effectively superimposed or registered to reconstruct the original color scene. The circuitry of the signal processing circuits and methods of visually reproducing the full color image are manifold. Examples of such systems are shown and described in an article "New Directions in Color Television" appearing in the December 1949 issue of Electronics, page 66. Another pertinent article entitled "Dot Systems of Color Television" by Wilson Boothroyd also appears in two parts in the December 1949 and January 1950 issues of the same magazine.

The actual signal sampling at the color television transmitter and signal distribution at the receiver, has in the prior art been based upon the use of successive discrete intervals as described above during which color information corresponding to different primary color channels is being communicated. In order to minimize cross-talk between the channels, it has been found expedient in the prior art to separate the actual intervals during which color television information is being sent by other intervals in which other information is being sent. This acts to prevent any hangover or delayed transient of one color interval from directing color reproducing corresponding to the next color interval. To accomplish this guard technique between sampling intervals, use has been made of pulse type signal sampling in signal distributing circuits. By varying the width of the pulses applied to the circuits the sampling intervals themselves may be made of any convenient duration and the guard interval between sampling pulses be adjusted in any manner desired. The use of discrete sampling intervals has, however, resulted in the production on the color television screen of a very noticeable dot pattern and the quiescent or no signal intervals between the successive sampling pulses has reduced the overall brightness of the color television image.

It is, therefore, a purpose of the invention to overcome some of the disadvantages encountered in prior art sampling and multiplex signal distribution systems especially the type used in color television systems.

Consequently, it is another purpose of the present invention to provide an improved time division multiplex sampling and signal distribution system and apparatus which provides time sharing transmission and reception of a plurality of signal channels without the exercise of discrete signal sampling and signal distribution intervals.

It is another purpose of the present invention to increase the brightness of color television image reproduced through the agency of a time division multiplex system.

It is yet another purpose of the present invention to provide an improved simplified and efficient signal sampling and signal distributing system and apparatus for time division multiplex communications.

In the realization of the above objects and features of advantage, the present invention as applied, for example, to a color television system contemplates the use of a novel phase detecting system which develops a plurality of control voltages each indicative of the color being transmitted. In a system where the color image is produced by means of three separate electron guns each exciting a phosphor screen of a different color, three separate phase indicating potentials are developed. Each phase indicating signal is representative of the phase difference between the incoming color television signal and a different one of three single frequency datum signals having relative phase displacements with respect to one another. The phase indicating potentials are then respectively applied to different electron guns while the incoming color television signal is simultaneously applied to all three electron guns.

By properly restricting the frequencies of the incoming color signal upon which the phase indicating potentials are based, the relative balance between the electron guns to produce any given color value will be established by the phase indicating potentials while the brightness of any given color will be controlled by the incoming color signal as directly applied to the electron guns.

A more complete understanding of the present invention in addition to other objects and features of advantage may be obtained through a reading of the following description especially when taken in connection with the accompanying drawing wherein.

Figure 1:
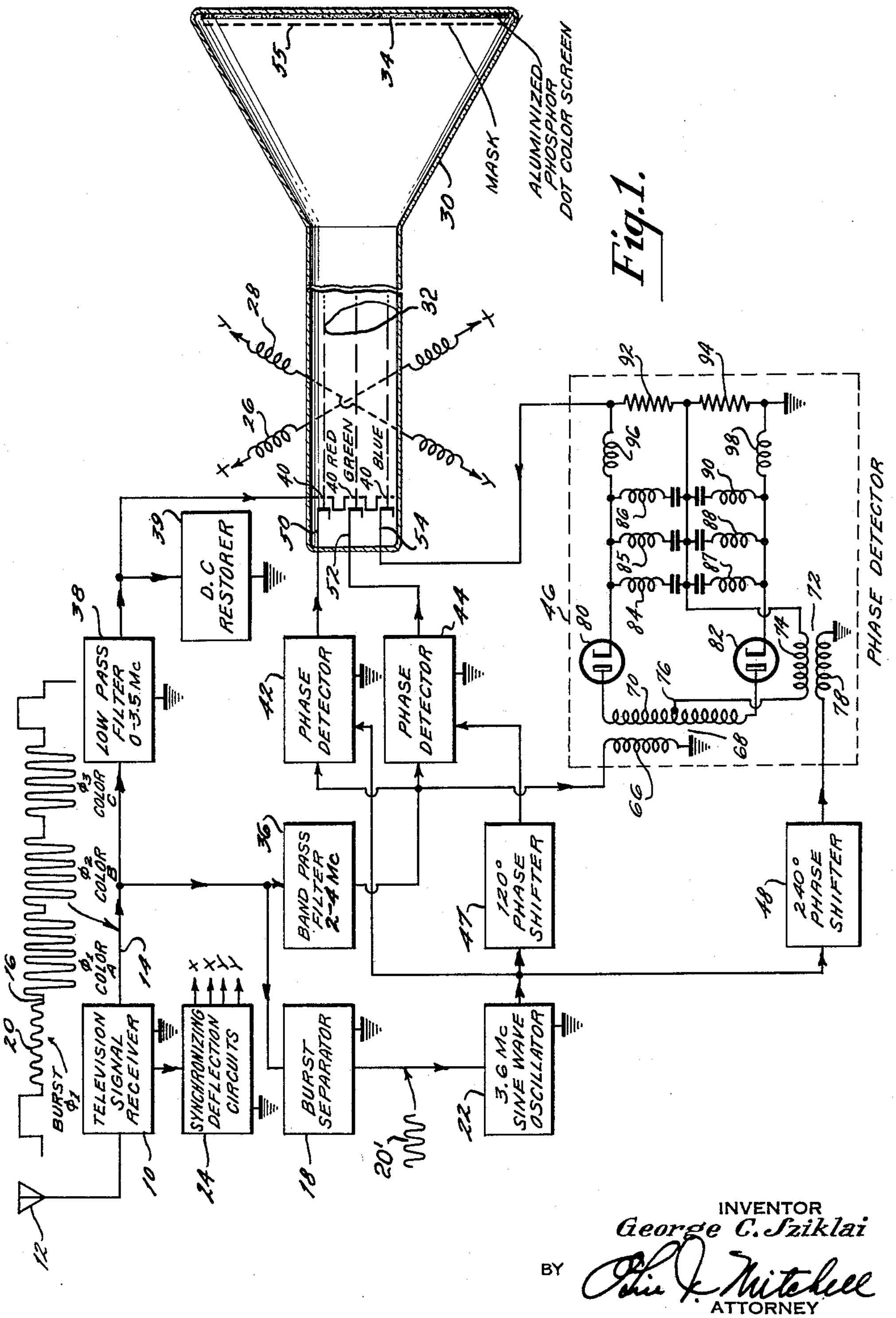
FIGURE 1 is a combination block diagram and schematic representation of one embodiment of the present invention as applied to a color television receiving system.

Turning now to FIGURE 1, there is indicated at 10 a typical television signal receiver. Signals picked up by the antenna 12 are fed to the receiver 10 and are amplified and demodulated thereby. The demodulated signals appearing at the output 14 of the receiver 10 appear substantially as shown at 16. By way of example only, this signal is illustrated as being of the dot multiplex color television type. The signal 16 is then applied to a burst separator circuit 18 which separates the burst 20 from the received signal 16. The separated burst 20' is then used to synchronize a sine wave oscillator 22 having a frequency by way of example, equal to the multiplex frequency of the dot color system e.g. according to present proposals in the art approximately 3.6 mc. Information derived from the received signal 16 by the television receiver 10 is also used to control the synchronization and deflection circuits 24 for the television receiver. The output of the deflection circuits are respectively applied to the deflection yokes 26 and 28 of the cathode ray tube 30. The composite electron beam 32 is thereby caused to produce a typical scanning raster on the phosphor screen 34 of the tube 30.

The arrangement thus far described in connection with FIGURE 1 is conventional in every respect, except for burst separation and utilization. Circuits for accomplishing the functions indicated, are shown and described in full detail in an article entitled "Television Receivers" by Antony Wright appearing in the March 1947 issue of the RCA Review, pages 5 through 28. Detailed information as to the arrangement for burst separation are described in a recent pamphlet "Recent Development in Color Synchronization in the RCA Color Television System" issued to the Federal Communications Commission in February 1950 by the Radio Corporation of America, RCA Laboratories Division. Another disclosure of a burst type of color synchronizing system is in U.S. Patent No. 2,594,380, issued April 29, 1952, to L. E. Barton and P. H. Werenfels and titled "Synchronizing Apparatus for Color Signal Sampling Oscillators." Such a system, in general, forms the subject matter of a copending U.S. patent application of A. V. Bedford, Serial No. 143,800, filed February 11, 1950, and titled "Synchronizing Apparatus." This application issued December 27, 1955, as Patent No. 2,728,812.

According to the present invention, the demodulated color signal 16 is also applied to a band pass filter 36 which passes only the upper frequency components of the signal, for example, 2 to 4 mcs. The signal 16 is also passed through a low pass filter 38 which preferably passes all signals up to but not including the sampling frequency of the dot multiplex system. The output of this filter 38 is applied to the grids 40 of the three gun cathode ray color tube 30. In further accordance with the present invention the output of the band pass filter 36 is applied to the input of three separate signal comparing circuits 42, 44 and 46. For the purpose of the embodiment shown in FIGURE 1, these signal comparing circuits have been indicated as phase detectors, but may take other forms. The three phase detector circuits 42 and 44 are identical in form and may be of the balanced modulator variety a species of which is shown, for example, in the dotted line area 46. The signal passed by the filter 36 is compared in phase and in amplitude by the phase detectors 42, 44 and 46, with different phase displaced versions of the 3.6 mc. reference frequency developed by the oscillator 22. The reference signal applied to the phase detector 44 is by merit of the phase shifter 47, delayed 120 degrees with respect to the version of the same reference signal applied to the phase detector 42. Furthermore, the reference signal applied to the phase detector 46 is likewise shifted 240 degrees by phase shifter 48. The phase shift values of the 120 degrees and 240 degrees are, of course, only exemplary of preferred values of phase shift and other values may be employed without departing from the scope of the present invention. The outputs of the respective phase detectors 42, 44 and 46 are respectively applied to the cathodes 50, 52 and 54 of the three electron guns housed in the cathode ray color tube 30.

The arrangement of the cathode ray target 34 and its associated mask 55 in the color tube 30 is disclosed in the above mentioned publication issued to the Federal Communications Commission, April 1950, entitled "General Description of Receivers for the RCA Color Television System Which Employ RCA Direct View Tri-Color Kinescopes." The particular tri-color kinescope of interest in connection with this illustrative embodiment of the present invention also is disclosed in greater detail in a paper titled "A Three-Gun Shadow-Mask Color Kinescope," by H. B. Law, published in the Proceedings of the I.R.E., vol. 39, No. 10, October 1951, at page 1186. Such an arrangement is also the subject matter of U.S. Patent No. 2,595,548, granted May 6, 1952, to A. C. Schroeder and titled "Picture Reproducing Apparatus." From these references it will be seen that each of the three electron guns of the tube 30 is productive of an electron beam which strikes the mask 55 at a different angle. These electron beams make up the composite electron beam 32, previously described. The dot color screen 34 is arranged in such a manner that the electrons from any one gun can strike only a single color phosphor no matter which part of the raster is being scanned. The mask 55 may be comprised of a sheet of metal spaced from the phosphor screen and containing 117,000 holes or one hole for each of the tri-colored dot groups. This hole is so registered with its associated dot group that the difference in the angle of approach of the three oncoming beams determines the color. Thus, three color signals applied to the cathodes of the three guns will produce independent pictures in the three primary colors represented by the phosphors on the color screen. The picture will appear to the eye to be superimposed because of the close spacing of the very small phosphor dots.

Although a particular tri-color kinescope having three guns is shown in FIGURE 1, an understanding of the present invention will make it clear that its utility is in no way thereby limited. For example, three separate guns in three separate envelopes may be substituted for the tri-color kinescope. On the other hand, with proper control measures the present invention may be applied to a single gun kinescope. A representative single gun color kinescope is described in a paper titled "A One-Gun Shadow-Mask Color Kinescope," by R. R. Law, published in the Proceedings of the I.R.E., vol. 39, No. 10, October 1951, at page 1194. Such a kinescope also forms the subject matter of a copending U.S. patent application of R. R. Law, Serial No. 130,195, filed November 30, 1949, and tilted "Color Television Reproduction Tube." This application was abandoned in favor of a continuation-in-part application Serial No. 143,405, filed February 10, 1950, which issued December 7, 1954, as Patent No. 2,696,571, titled "Color Kinescope."

For the immediate purpose of obtaining a clear understanding of the operation of the present invention it will be assumed, by way of example, that the upper gun of FIGURE 1 is productive of a red light on the surface of the color screen. Therefore electrical signals applied to the cathode 50 of the kinescope 30 will produce red color variations on the screen of the tube. Cathodes 52 and 54 will correspondingly be assigned to guns producing the colors green and blue. From this it will be understood that if a whole red picture were desired it would be only necessary to apply sufficiently negative voltage to the cathode 50 to turn the corresponding beam on. High frequency variations in the intensity of the red image, of course, may be obtained by other signal variations applied to the grid 40 of the tube. Like observations may be made with respect to the actions of the cathodes 52 and 54. By turning all three guns on at the same time, of course white light will be produced. By proportioning the beam intensities successively produced by the three guns most any desired color effect may be produced on the color kinescope screen 34.

According to the present invention, the proper voltages for the cathodes 50, 52 and 54 are obtained from the above described use of the phase detectors 42, 44 and 46. As stated above, the phase detectors may be of any convenient type which will detect a relative phase of an incoming signal with respect to some fixed signal standard. Purely by way of example, the phase detector arrangement in the dotted line area 46 has been shown to be of the balanced modulator variety well-known in the communications art. In the particular form of the invention shown in FIGURE 1, it is not only desirable that the phase detector indicate relative phase relations between the applied signals, but also indicate relative amplitude differences between such signals. It will be seen therefore that forms of phase detectors other than the balanced modulator variety may be used. Therefore for the purposes of this invention the phrase "balanced modulator type phase detectors," or the like, will be meant to include all types of signal multiplying circuits which provide an output corresponding to the difference of two frequencies fed to the detector. In a conventional modulator carrier signal having an angular frequency of $\omega$, the resultant modulation signal has the form of $$((A+B)\cos\Omega t)(C+D\cos\omega t)=AC+(BC\cos\Omega t)+(AD\cos(\omega t)+\left(\frac{BD}{2}\cos(\Omega-\omega)t\right)+\left(\frac{BD}{2}\cos(\Omega+\omega)t\right)$$

where A, B, C and D are constants. See page 532, Radio Engineer's Handbook, by F. Terman. However the signal comparing or phase detecting circuit to be used in the present invention will provide an output corresponding only to the fourth term of the right-hand side of the above equation and will suppress by means of balance and/or filters the remaining terms of the right-hand side of the above equation.

In the particular arrangement of the phase detector 46 in FIGURE 1, the output of the band pass filter 36 is applied to the primary 66 of the band pass transformer 68. The transformer 68 is designed to have a substantial response to all frequencies passed by the band pass filter 36.

The signal appearing at the center tap secondary of the band pass transformer is applied to one of the inputs of a typical balanced modulator type detector shown in the diagram. The phase detector includes another transformer 72 whose secondary 74 is connected between the center tap 76 on winding 70 and the output impedance of the balanced detector. The primary 78 of transformer 72 is supplied with reference signals from the oscillator 22 through the phase shifter 48. Thus, there will be induced across the secondary 74 a voltage corresponding to the 240° version of the sine wave provided by the oscillator 22. The high frequency components of the incoming color signal will be made to appear across the upper and lower sections of the winding 70 across each of these secondary transformer sections and will also appear at the 240° version of the sine wave oscillator 22 by merit of the paths provided by the diodes 80 and 82 taken in combination with the impedances 84, 85, 86, 87, 88 and 90. Each of these latter impedances has been shown as being of the series tuned circuit type but may take any of a variety of other forms. For the purpose of the present invention it is desirable that these impedances appear low in value to the high frequency components supplied by the transformer 68 while appearing high in value to any low frequency components produced by the non-linear action of the balanced modulator. Reference to page 200 of the Radio Engineer's Handbook, by F. Terman, 3rd edition, will indicate various other parametric configurations which will produce most any desirable impedance versus frequency characteristic.

With impedance elements of the character described, the output of the balanced modulator, appearing across the load resistances 92 and 94 will represent substantially only the low frequency components produced by the balanced modulator action. This will correspond to the right hand term of the above equation explaining the modulation produced by the balanced modulator type phase detector. Inductances 96 and 98 further act to restrict passage to the load circuit 92 and 94 of high frequency components.

Generally speaking, in the use of this particular form of balanced modulator circuit for the present invention, it is desirable that the signal amplitude of the reference voltage appearing across the secondary 74 of transformer 72 be of such an amplitude that it is always higher than the incoming signal as developed across the sections of the band pass transformer 68.

For example, it will be appreciated that if the amplitude of the reference signal across secondary 74 is lower than the signal voltage developed across the secondary sections of transformer 68 the output characteristic of the balanced modulator will be discontinuous with respect to amplitude increases in either of the applied signals.

The operation of that aspect of the present invention having to do with a phase detector per se is substantially as follows. If both the sine wave oscillator and color signal are in phase with one another as applied to the phase detetcor, it is apparent that the two signals will in effect add across the upper section of the center tap winding 70 while they will subtract across the lower portion of the center tap winding 70. If both signals were of the same amplitude this would mean that zero voltage would be applied to the diode 82 and twice the peak of either signal would be applied across the diode 80. This would render the upper terminal of resistor 92 positive with respect to the lower terminal of resistor 94. If the signals on the other hand were 180° out of phase the reverse action would obtain and the upper terminal of resistor 92 would become negative with respect to ground. If the voltages are 90° out of phase with one another, then equal currents will be passed by each of the diodes 80 and 82 and the result will be a net voltage of zero across the load terminals of resistors 92 and 94.

Inspection will show that the phase versus output voltage of the detector circuit is substantially sinusoidal in form and for small variations along the steep side of the sine wave characteristic, is virtually linear. The manner in which the voltage adds or subtracts across the center tap transformer winding 70 also provides that an increase in the amplitude of either signal will provide a substantially linear increase in the output voltage developed across the resistors 92 and 94, for any given phase relation. Thus, it is seen that for the output voltage across resistors 92 and 94 to linearly reflect both changes in amplitude and phase, one of the input voltages to the detector system must be held substantially above even the highest amplified excursion of the other as described above.

We will now examine the operation of the present invention to provide color changes on the face of the color kinescope 30 in accordance with color signal. First, consider the transmission of an all white picture. Under such conditions no 3.6 megacycle color component will be transmitted by the transmitter since each of the green, red and blue components will be equal in amplitude. The outputs of all the phase detectors 42, 44 and 46 will then be equal to zero and the grids 40 will, by merit of the D.C. restorer 39, assume some negative value with respect to the cathodes so as to establish equal beam intensities in each color gun. If a maximum white signal is being transmitted the grids 40 will assume their least negative potential with respect to the cathodes 50, 52 and 54. If, now, a single color such as color A (corresponding, for example to red) is transmitted, the incoming signal applied to each of the phase detectors will be of phase 1. Phase 1 corresponds to the phase of the burst 20. The output of phase detector 42 will then be maximum in a negative direction and will thereby swing the cathode 50 in a negative direction with respect to ground. This will tend to increase the beam intensity in the red gun. However, upon transmission of a single color the average potential of the grids 40 during the peak of the red sine wave will be more negative than during the transmission of an all white signal. Thus, the negative swing of the grid 40 and the negative swing of the cathode 52 compensate to leave the beam intensity in the red gun the same. However, the negative swing of the grids 40 will cutoff the green and blue guns when taken in combination with the positive voltage applied to the cathodes 52 and 54 by the phase detectors 44 and 46 during reception of the single red color. Corresponding action will, of course, be obtained during the reception of an all green or an all blue signal. Since the phase and amplitude characteristics of the phase detectors are substantially linear, it follows that any combination of colors may be reproduced on the screen of the kinescope 30.

Figure 2:
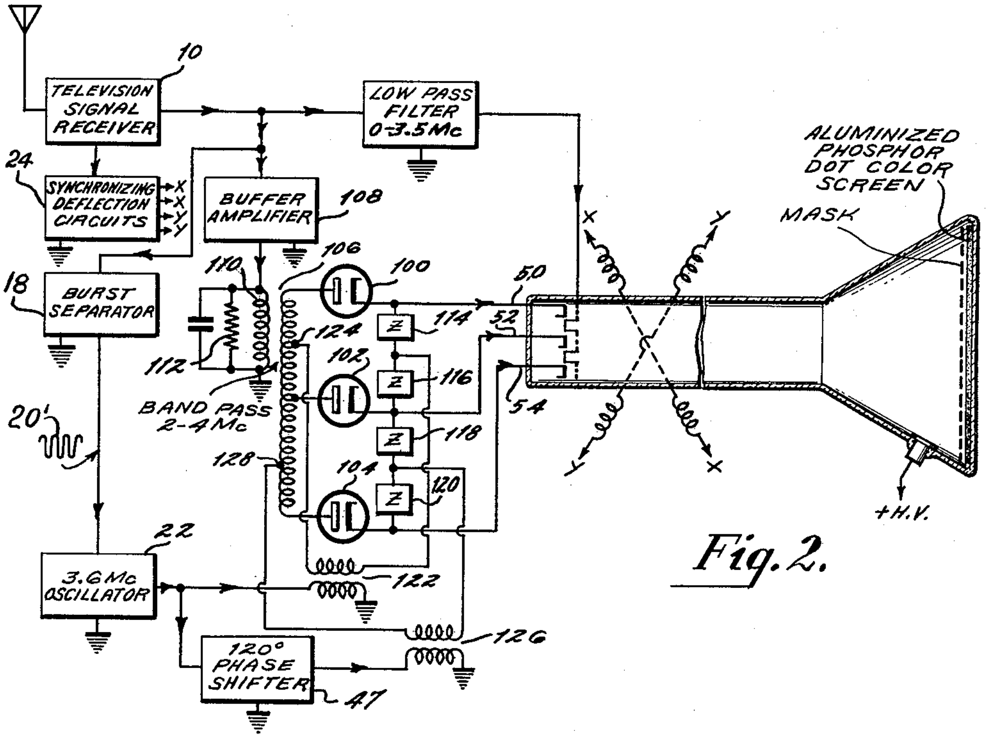
FIGURE 2 is a block diagram and schematic representation of still another form of the present invention as applied to a color television receiving system.

Another embodiment of the present invention is shown in FIGURE 2. The basic arrangement of FIGURE 2 is substantially the same as FIGURE 1 except for the following modifications. Instead of using three separate balanced modulator phase detectors a novel form of phase detector provided by the present invention is employed. This phase detector utilizes only three diodes 100, 102 and 104. They are connected at three separate points along the secondary of a band pass transformer 106. The band pass transformer is adjusted to provide the required band pass of 2 to 4 megacycles corresponding to the band pass filter 36 in FIGURE 1. A buffer amplifier 108 is additionally shown as connected between the output of the signal receiver 10 and the primary 110 of the transformer 106. Resistor 112 is indicated for properly broadening the response characteristic of the transformer to provide the required band pass. Impedance elements 114 and 116 are connected in series combination with diodes 100 and 102. Load impedance elements 118 and 120 are connected between the cathodes of diodes 102 and 104 in series combination. The output of the 3.6 megacycle oscillator 22 is then directly applied by a transformer 122 to the tap 124 on the transformer secondary. The reference terminal for this oscillator voltage is the center tap between impedance elements 114 and 116. Similarly, a 120° version of the sine wave standard appears at the output of the phase shifter 47. This is applied via transformer 126 between the center tap of impedance elements 118 and 120 and the tap 128 on the band pass transformer 106 secondary. The output voltages of the phase detector circuit for application to the cathodes 50, 52 and 54 are respectively made available at the cathodes of the respective diodes 100, 102 and 104. The load impedances are preferably, although not necessarily, of the type shown and described in connection with FIGURE 1. Such load impedances will, of course, be provided with a resistive component to provide direct current conduction between the diodes.

The scheme of the present invention for providing color in the arrangement of FIGURE 2 is identical to that shown and described in connection with FIGURE 1. The arrangement in FIGURE 2 can be seen to be much simpler than that of FIGURE 1. A saving of three diodes has been made as well as a phase shifting network.

Figure 3:
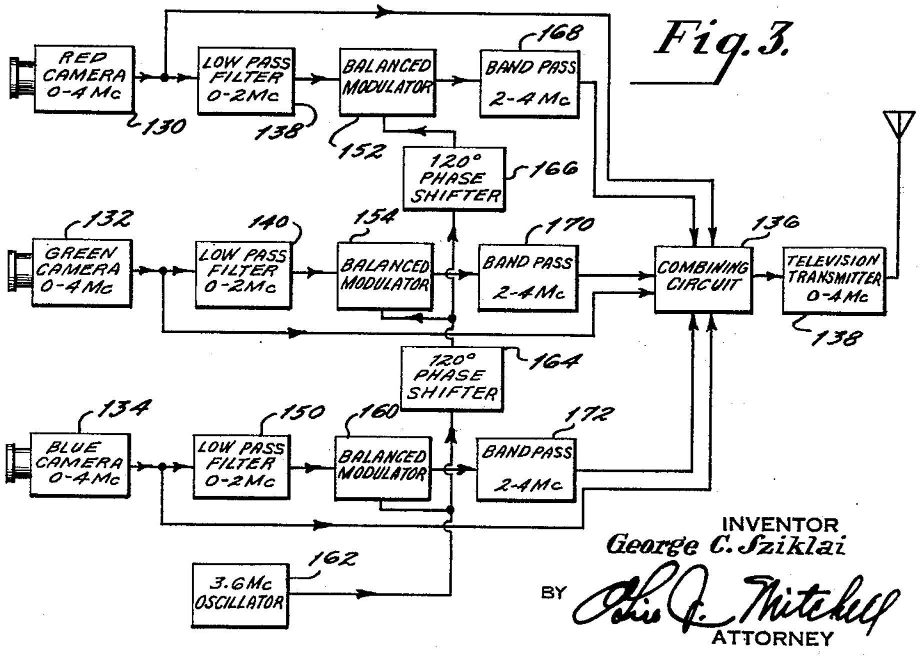
FIGURE 3 is a block diagram representation of the present invention as applied to a color television transmission system.

The arrangement in FIGURE 3 is shown as indicative of one of many ways in accordance with this invention in which a color signal, suitable for use by a receiver embodiment of the present invention, can be produced. For example, the three color channels are headed by color cameras 130, 132 and 134, respectively, responsive to red, green and blue color components in the televised scene. The full 0–4 megacycle outputs of these cameras are directly applied to the combining circuit 136. The outputs of these cameras are also respectively conducted through 0–2 megacycle low pass filters 138, 140 and 150 to balanced modulator type circuits 152, 154 and 160. A source of standard signal at the sampling rate is provided at 162. The output of the oscillator 162 is then applied to the balanced modulator circuits by means including appropriate phase shifting networks 164 and 166. The outputs of the balanced modulator circuits are then applied to band pass filters 168, 170 and 172 which are adapted to pass the frequencies in 2–4 megacycle range, corresponding to the right hand term of the above given modulation equation. The outputs of these band pass circuits are then applied to the combining circuit 136 for combination with the direct outputs of the red, green and blue cameras. The resulting signal appearing in the output of the combining circuit is substantially the same as the signal 16 of FIGURE 1 and is then applied to the television transmitter 138 for modulation thereof.

From the foregoing description, it will be seen that the present invention has provided a simple, novel and highly effective transmitting and receiving arrangement for color television systems. Since continuous wave sampling from a sine wave oscillator or the like is employed, the discrete sampling intervals previously employed by prior art systems have been obviated with a resultant increase in picture brightness. Furthermore, since the individual beams produced by the color guns shown in the present invention are not discretely keyed on and off, "moiree" and dot pattern effects are greatly reduced.

Having thus described my invention what is claimed is:

1. A receiver for use in a color television system of the type in which a composite video signal includes one component varying in amplitude and within a predetermined band of frequencies to represent brightness of a subject and another component comprises a color carrier wave having one of said brightness signal frequencies and varying in phase and amplitude respectively to represent hue and chroma of said subject, said receiver comprising, means to receive said composite video signal, a brightness signal-conveying channel having input and output circuits, means coupling the input circuit of said brightness channel to said signal-receiving means, means in said brightness channel to produce in its output circuit a total brightness signal in a predetermined portion of said band of frequencies, a color signal-conveying channel having input and output circuits, means coupling the input circuit of said color channel to said composite signal-receiving means, phase detector means in said color channel responsive to said color carrier wave to produce in its output circuit color difference signals in another predetermined portion of said band of frequencies, said color difference signal-producing means being adapted to eliminate from said color difference signals any total brightness information in a frequency range common to said two predetermined portions of said band of frequencies, and means coupled to the output circuits of said brightness and color channels to combine said produced brightness and color difference signals.

2. A color television receiver as defined in claim 1 wherein, said total brightness signal-producing means is adapted to produce a total brightness signal in substantially the entire range of said band of frequencies, and said color difference signal-producing means is adapted to eliminate substantially all of said brightness information from said produced color difference signals.

3. A color television receiver as defined in claim 1 wherein, said brightness channel input circuit coupling means includes a low pass filter, said color channel input circuit coupling means includes a high pass filter covering a range from an intermediate to the upper frequencies of said low pass filter, said color difference signal-producing means being adapted to develop said color difference signals in a range from the lower to the intermediate frequencies of said low pass filter and to eliminate substantially all of said brightness information from said produced color difference signals in said last-named range of frequencies.

4. In a color television receiver, the combination including: means to receive a color signal having a first component representing brightness and a second component including a wave having a fixed frequency and a variable phase representing the color of an object; a source of a reference signal having a fixed frequency equal to and synchronized with said color signal wave frequency; a plurality of phase detectors, each having at least two input terminals and an output terminal and being of a character to produce color indicating signals at said output terminal representative of the phase relationship of two signals of the same frequency impressed respectively upon said input terminals; means for impressing said received color signal upon one input terminal of each of said phase detectors; means for impressing different phases of said reference signal respectively upon the other input terminals of said phase detectors, the particular phase relationships between said impressed reference signals and said color signal wave being determinative of the particular color indicating signals produced by said phase detectors; signal combining electron tube means having a plurality of pairs of electrodes, said respective pairs of electrodes jointly controlling the intensity of a plurality of electron streams; means for impressing said received color signal upon a first one of each of said pairs of electrodes; and means for impressing the color indicating signals produced at the output terminals of said phase detectors respectively upon the second one of each of said pairs of electrodes to effectively combine said first component of said received color signal additively with each of said color indicating signals produced at the output terminals of said phase detectors.

5. In a color television receiver, the combination including: means to receive a color signal, a first component representing brightness and a second component including a wave having a fixed frequency and a variable phase representing the color of an object; a source of a reference signal having a fixed frequency equal to and synchronized with said color signal wave frequency; a plurality of balanced modulators, each having at least two input terminals and an output terminal and being of a character to produce color indicating signals at said output terminal representative of the phase relationship of two signals of the same frequency impressed respectively upon said input terminals; means for impressing said received color signal upon one input terminal of each of said balanced modulators; means for impressing different phases of said reference signal respectively upon the other input terminals of said balanced modulators, the particular phase relationships between said impressed reference signals and said color signal wave being determinative of the particular color indicating signals produced by said phase detectors; signal combining electron tube means having a plurality of pairs of electrodes, said respective pairs of electrodes jointly controlling the intensity of a plurality of electron streams; means for impressing said received color signal upon a first one of each of said pairs of electrodes; and means for impressing color indicating signals produced at the output terminals of said balanced modulators respectively upon the second one of each of said pairs of electrodes to effectively combine said first component of said received color signal additively with each of said color indicating signals produced at the output terminals of said balanced modulators.

6. In a color television receiver, the combination including: means to receive a color signal having a first brightness representative component with frequencies occurring from a given minimum frequency up to a given maximum frequency and a second component with frequencies occurring from a frequency intermediate of said given minimum and maximum frequencies up to said maximum frequency, said second component including a wave having a fixed frequency and a variable phase representing the color of an object; a source of a reference signal having a fixed frequency equal to and synchronized with said color signal wave frequency; a plurality of balanced modulators, each having at least two input terminals and an output terminal and being of a character to produce signals at said output terminal representative of the phase relationship of two signals of the same frequency impressed respectively upon said input terminals; means including a band pass circuit adapted to pass only signal frequencies in the range between said intermediate and maximum frequencies for impressing said second component of said received color signal upon one input terminal of each of said balanced modulators; means for impressing different phases of said reference signal respectively upon the other input terminals of said balanced modulators, the particular phase relationships between said impressed reference signals and said color signal wave being determinative of the particular color indicating signals produced by said balanced modulators; signal combining electron tube means having a plurality of pairs of electrodes, said respective pairs of electrodes jointly controlling the intensity of a plurality of electron streams; means for impressing said first component of said received color signal upon a first one of each of said pairs of electrodes; and means for impressing the color indicating signals produced at the output terminals of said balanced modulators respectively upon the second one of each of said pairs of electrodes to effectively combine said first component of said received color signal additively with each of said color indicating signals produced at the output terminals of said balanced modulators.

7. In a television system for processing a composite television signal divisible into low and high frequency components, said high frequency component including a phase-modulated wave, an electron discharge tube having at least first and second control circuits, means for applying the low frequency component and at least part of the high frequency component of said composite signal directly to one of said control circuits, phase detector means having at least two input circuits and an output circuit to produce in said output circuit a control signal indicative of the phase relation of signals applied to said input circuits, a high pass filter adapted to communicate only the high frequency component of said composite signal being connected to one input of said phase detector means, means for applying said composite signal to the input of said high pass filter, a source of a fixed phase standardizing signal having a fixed frequency falling within the pass band of said high pass filter, connections from said source of standardizing signal to the other input of said phase detector means for applying said standardizing signal to said phase detector means, and means coupling the output of said phase detector means to the other control circuit of said discharge tube for applying said phase indicating control signal to said other discharge tube control circuit.

8. A television system according to claim 7 wherein said phase detector means is of the balanced modulator variety which employs a balanced output impedance and wherein at least a portion of said output impedance comprises a low pass filter configuration adapted to pass substantially all frequencies below the lowest frequency communicated by said high pass filter.

9. In a color television receiver, the combination including: means for receiving a composite color signal divisible into low and high frequency components, said high frequency component including a phase-modulated wave; an image-reproducing cathode ray tube having at least first and second electron beam intensity control electrodes, means for applying the low frequency component and at least part of the high frequency component of said composite color signal directly to said first control electrode, phase detector means having at least two input circuits and an output circuit and adapted to produce in said output circuit a control signal indicative of the phase relation of signals applied to said respective input circuits, a high pass filter adapted to pass only the high frequency component of said composite signal, the output of said high pass filter being connected to one input of said phase detector means, means for applying said composite signal to the input of said high pass filter, a source of a fixed phase reference signal having a fixed frequency falling within the pass band of said high pass filter, connections from said source of reference signal to the other input of said phase detector means for applying said reference signal to said phase detector means, and means coupling the output of said phase detector means to the other control electrode of said cathode ray tube for applying said phase-indicating control signal to said second control electrode, whereby to control said electron beam intensity by said composite color signal and by said phase-indicating control signal.

10. In a color television receiver, the combination including: means for receiving a composite color signal divisible into low and high frequency components, said high frequency component including a phase-modulated wave, an image-reproducing cathode ray tube having at least first and second electron beam intensity control electrodes, means for applying the low frequency component and at least part of the high frequency component of said composite color signal directly to said first control electrode, balanced modulator type of phase detector means having at least two input circuits and an output circuit and adapted to produce in said output circuit a control signal indicative of the phase relation of signals applied to said respective input circuits, a high pass filter adapted to pass only the high frequency component of said composite signal, the output of said high pass filter being connected to one input of said balanced modulator phase detector means, means for applying said composite signal to the input of said high pass filter, a source of a fixed phase reference signal having a first frequency falling within the pass band of said high pass filter, connections from said source of reference signal to the other input of said balanced modulator phase detector means for applying said reference signal to said balanced modulator phase detector means, the output circuit of said balanced modulator phase detector means including a balanced output impedance, at least a portion of which comprises a low pass filter configuration adapted to pass substantially all frequencies below the lowest frequency passed by said high pass filter, and means coupling said balanced output impedance of said balanced modulator phase detector means to said second control electrode of said cathode ray tube for applying said phase-indicating control signal to said second control electrode, whereby to control said electron beam intensity by said composite color signal and by said phase-indicating control signal.

11. In a color television receiver, the combination including: means for receiving a composite color signal divisible into low and high frequency components, said high frequency component including a phase-modulated wave, an image-reproducing cathode ray tube having a plurality of pairs of first and second electron beam intensity control electrodes, said pairs of electrodes respectively controlling the intensity of a plurality of electron beams capable of producing a respective plurality of component colors of an object, means for applying the low frequency component and at least part of the high frequency component of said composite color signal directly to all of said first control electrodes, a plurality of balanced modulator type of phase detector means, each having at least two input circuits and an output circuit and adapted to produce in said output circuit a control signal indicative of the phase relation of signals applied to said respective input circuits, a high pass filter adapted to pass only the high frequency component of said composite signal, the output of said high pass filter being connected to one input of each of said balanced modulator phase detector means, means for applying said composite signal to the input of said high pass filter, a source of a fixed phase reference signal having a first frequency falling within the pass band of said high pass filter, connections from said source of reference signal to the other input of each of said balanced modulator phase detector means for applying different phases of said reference signal to respective ones of said balanced modulator phase detector means, the output circuit of each of said balanced modulator phase detector means including a balanced output impedance, at least a portion of which comprises a low pass filter configuration adapted to pass substantially all frequencies below the lowest frequency passed by said high pass filter, and means coupling the balanced output impedances of said balanced modulator phase detector means respectively to the second control electrodes of said cathode ray tube for applying said phase-indicating control signals to said second control electrodes, whereby to control the intensity of said electron beams by said composite color signal and by said respective phase-indicating control signals.

12. In a color television receiver for a composite video signal having a brightness component and a color component, said color component including a wave modulated in phase by color representative signals, the combination including: image-reproducing means including first beam-intensity control electrode means to control the total amount of light produced and second beam-intensity control electrode means to control the color of said produced light; means for applying the brightness component of said composite video signal to said first beam-intensity control electrode means to correspondingly control the total light produced by said image-reproducing means; phase detecting means responsive to the color component of said composite video signal to derive said color representative signals from said phase-modulated wave; and means for applying said derived color representative signals to said second beam-intensity control electrode means to correspondingly control the color of the light produced by said image-reproducing means.

13. In a color television receiver for a composite video signal having a brightness component and a color component, and divisible into low and high frequency portions, said brightness component including said low and at least part of said high frequency portions, said high frequency portion also including said color component comprising a wave modulated in phase by color representative signals, the combination including: image-reproducing means including a plurality of first beam-intensity control electrodes to control the total amount of light produced and a plurality of second beam-intensity control electrodes to control the color of said produced light; means for applying the brightness component of said composite video signal to said first plurality of electrodes to correspondingly control the total light produced by said image-reproducing means; phase detecting means responsive to the color component of said composite video signal to derive said color representative signals from said phase-modulated wave; and means for applying said derived color representative signals respectively to said second plurality of electrodes to correspondingly control the color of the light produced by said image-reproducing means.

14. In a color television receiver for a composite video signal having a brightness component and a color component, and divisible into low and high frequency portions, said brightness component including said low and at least part of said high frequency portions, said high frequency portion also including said color component comprising a wave modulated in phase by color representative signals, the combination including: image-reproducing means including a group of cathode electrodes and a group of control grid electrodes associated respectively with said cathode electrodes; means for applying the brightness component of said composite video signal to one group of said electrodes to correspondingly control the total light produced by said image-reproducing means; high pass filter means to segregate said high frequency video signal portion from said composite video signal; phase detecting means coupled to said high pass filter means to receive said segregated high frequency video signal portion and responsive to the color component of said composite video signal to derive said color representative signals from said phase-modulated wave; and means for applying said derived color representative signals respectively to said other group of electrodes to correspondingly control the color of the light produced by said image-reproducing means.

15. In a color television receiver for a composite video signal having a brightness component and a color component, and divisible into low and high frequency portions, said brightness component including said low and at least part of said high frequency portions, said high frequency portion also including said color component comprising a wave modulated in phase by color representative signals, the combination including: signal-combining means having two input circuits respectively to receive two signals to be combined and an output circuit in which to produce a combined signal; means for applying said brightness component of said composite video signal to one of the input circuits of said signal-combining means; phase-detecting means responsive to the color component of said composite video signal to derive said color representative signals from said phase modulated wave; and means for applying said derived color representative signals to the other input circuit of said signal-combining means to produce means to produce in the output circuit of said signal-combining means a signal representing one of the component colors of an object.

16. In a color television receiver for a composite video signal having a brightness component and a color component, and divisible into low and high frequency portions, said brightness component including said low and at least part of said high frequency portions, said high frequency portion also including said color component comprising a wave modulated in phase by color representative signals, the combination including: signal-combining means having a plurality of pairs of first and second input circuits, each of said pairs of circuits respectively being adapted to receive two signals to be combined, said signal-combining means also having an output circuit for each pair of input circuits and in which to produce a combined signal; means for applying said brightness component of said composite video signal to all of said first input circuits of said signal-combining means; phase-detecting means responsive to the color component of said composite video signal to derive said color representative signals from said phase modulated wave; and means for applying said derived color representative signals respectively to said second input circuits of said signal-combining means to produce in the respective output circuits of said signal-combining means signals representing a plurality of the component colors of an object.

17. A color-television receiver for utilizing a brightness signal representing the combination of three primary-color signals and for concurrently utilizing color-control signals, each color-control signal representing the amplitude difference between one of said primary color signals and a portion of said brightness signal, all such signals representing a scanned image at a transmitter, said receiver including: means for deriving said color-control signals and said brightness signal; an image reproducer including a set of cathode electrodes and a set of corresponding control electrodes; means for supplying said brightness signal to one of said sets of electrodes in parallel; and means for supplying said color-control signals to respective ones of the other of said sets.

References Cited in the file of this patent

UNITED STATES PATENTS

| | | |
|---|---|---|
| 2,163,747 | Crosby | June 27, 1939 |
| 2,332,681 | Wendt | Oct. 26, 1943 |
| 2,545,420 | Sziklai | Mar. 13, 1951 |
| 2,554,693 | Bedford | May 29, 1951 |
| 2,558,351 | Fredendall | June 26, 1951 |
| 2,563,406 | Goldberg | Aug. 7, 1951 |
| 2,580,685 | Mathes | Jan. 1, 1952 |
| 2,580,903 | Evans | Jan. 1, 1952 |
| 2,585,532 | Briggs | Feb. 12, 1952 |
| 2,614,246 | Dome | Oct. 14, 1952 |
| 2,634,324 | Bedford | Apr. 7, 1953 |
| 2,635,140 | Dome | Apr. 14, 1953 |
| 2,641,643 | Wentworth | June 9, 1953 |
| 2,644,032 | Maher et al. | June 30, 1953 |
| 2,646,463 | Schroeder | July 21, 1953 |
| 2,651,673 | Fredendall | Sept. 8, 1953 |
| 2,677,720 | Bedford | May 4, 1954 |
| 2,692,908 | Jepmond | Oct. 26, 1954 |

OTHER REFERENCES

"A Six-Megacycle Compatible High-Definition Color Television System," Radio Corporation of America, Sept. 26, 1949.